US 11,585,780 B2

(12) United States Patent
Hanko et al.

(10) Patent No.: US 11,585,780 B2
(45) Date of Patent: Feb. 21, 2023

(54) POTENTIOMETRIC PROBE

(71) Applicant: Endress+Hauser Conducta GmbH+Co. KG, Gerlingen (DE)

(72) Inventors: Michael Hanko, Dresden (DE); Thomas Wilhelm, Chemnitz (DE); Matthäus Speck, Göpfersdorf (DE); Detlev Wittmer, Maulbronn (DE); Manfred Jagiella, Notzingen (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 332 days.

(21) Appl. No.: 16/901,411

(22) Filed: Jun. 15, 2020

(65) Prior Publication Data
US 2020/0393404 A1 Dec. 17, 2020

(30) Foreign Application Priority Data

Jun. 14, 2019 (DE) ...................... 10 2019 116 287.4

(51) Int. Cl.
*G01N 27/403* (2006.01)
*G01N 27/40* (2006.01)
(Continued)

(52) U.S. Cl.
CPC ......... *G01N 27/4035* (2013.01); *G01N 27/31* (2013.01); *G01N 27/327* (2013.01);
(Continued)

(58) Field of Classification Search
CPC ...... G01N 27/31; G01N 27/36; G01N 27/333; G01N 27/40; G01N 27/4035; G01N 27/416
See application file for complete search history.

(56) References Cited

U.S. PATENT DOCUMENTS

| | | | | |
|---|---|---|---|---|
| 3,787,307 A | * | 1/1974 | Schwab | G01N 27/36 204/419 |
| 6,395,158 B1 | * | 5/2002 | King | G01N 27/36 205/787.5 |

(Continued)

FOREIGN PATENT DOCUMENTS

| | | |
|---|---|---|
| CN | 102265146 A | 11/2011 |
| CN | 102565165 A | 7/2012 |

(Continued)

OTHER PUBLICATIONS

Merriam-Webster: Definition of Module (Year: 2022).*

*Primary Examiner* — Luan V Van
*Assistant Examiner* — Caitlyn Mingyun Sun
(74) *Attorney, Agent, or Firm* — Christopher R. Powers; Endress+Hauser (USA) Holding, Inc.

(57) ABSTRACT

The present disclosure relates to a potentiometric probe for measuring a measured variable that represents an ion concentration in a measuring medium, including a probe base including a sensor circuit, and two electrochemical half-cells arranged such that one of the half-cells surrounds at least one portion of the other half-cell, wherein at least one of the half-cells is configured as a module which is connected to the probe base via a mechanical and electrical interface. In another embodiment, one of the half-cells is a measuring half-cell including an ion-selective membrane and a terminal lead which electrically contacts the ion-selective membrane. The other half-cell is a reference half-cell, wherein the measuring half-cell and/or the reference half-cell are each configured as a module which is connected to the probe base via a mechanical and electrical interface.

19 Claims, 3 Drawing Sheets

(51) Int. Cl.
*G01N 27/327* (2006.01)
*G01N 27/333* (2006.01)
*G01N 27/31* (2006.01)
*G01N 27/36* (2006.01)

(52) U.S. Cl.
CPC ........... *G01N 27/333* (2013.01); *G01N 27/36* (2013.01); *G01N 27/40* (2013.01)

(56) References Cited

U.S. PATENT DOCUMENTS

| | | | |
|---|---|---|---|
| 8,551,311 B2 * | 10/2013 | Woodward | G01N 27/36 204/435 |
| 2012/0152765 A1 * | 6/2012 | Trapp | G01N 27/4163 204/415 |
| 2018/0017526 A1 * | 1/2018 | Sankaran | G01N 27/333 |

FOREIGN PATENT DOCUMENTS

| | | | |
|---|---|---|---|
| CN | 102914581 A | 2/2013 | |
| CN | 102971622 A | 3/2013 | |
| CN | 109752435 A | 5/2019 | |
| DE | 2133419 B1 | 11/1972 | |
| DE | 2721939 A1 | 11/1978 | |
| WO | WO-2009055260 A1 * | 4/2009 | ......... G01N 27/4035 |

* cited by examiner

POTENTIOMETRIC PROBE

CROSS-REFERENCE TO RELATED APPLICATION

The present application is related to and claims the priority benefit of German Patent Application No. 10 2019 116 287.4, filed on Jun. 14, 2019, the entire contents of which are incorporated herein by reference.

TECHNICAL FIELD

The present disclosure relates to a potentiometric probe for measuring a measured variable that represents an ion concentration in a measuring medium.

BACKGROUND

Electrochemical sensors are used for the analysis of measuring media, especially measuring liquids, in laboratory and process measurement technology in many fields of chemistry, biochemistry, pharmacy, biotechnology, food technology, water management, and environmental metrology.

Electrochemical methods can be used to detect activities or concentrations of chemical substances, for example ion activities or the pH, value and thus correlated measured variables in liquids. The substance, the activity or concentration of which is to be measured is also referred to as an analyte. The measuring medium can be a measuring liquid such as an aqueous solution, emulsion, or suspension.

Potentiometric sensors generally comprise a measuring half-cell and a reference half-cell as well as a sensor circuit for detecting measured values and for signal processing. The measuring and reference half-cells can be combined in a measuring probe which can be immersed in the measuring liquid. This measuring probe may also include the sensor circuit or at least part of the sensor circuit. The measuring probe can be connected for communication to a higher-level unit, for example a measuring transducer, an electronic operating device, a computer or a controller, via a cable or wireless. The higher-level unit can be used for further processing the measured signals or measured values detected by means of the probe and for operating the measuring probe.

In contact with the measuring medium, the measuring half-cell forms a potential that is a function of the activity of the analyte in the measuring medium, whereas the reference half-cell provides a stable electrochemical reference potential that is mostly independent of the analyte concentration. The sensor circuit generates an analog or digital measurement signal which represents the electric potential difference between the measuring half-cell and the reference half-cell and, consequently, the activity of the analyte in the measuring medium. The measurement signal may be output from the sensor circuit to the higher-level unit, which further processes the measurement signal. A partial or complete further processing of the measurement signal in the sensor circuit in the measuring probe is also possible.

The reference half-cell is often designed as a second-type electrode, e.g. as a silver/silver chloride reference electrode, and electrically conductively connected to the measurement circuit. It may comprise a housing and a reference element arranged in the housing, e.g. a silver wire coated with silver chloride, which is in electrolytically conductive and/or ion-conducting contact with the measuring liquid in measuring operation via a reference electrolyte contained in the housing and an electrochemical transfer, for example a diaphragm.

The measuring half-cell includes a potential-forming sensor element, which may comprise an ion-selective membrane or layer, depending upon the type of the potentiometric probe. Examples of such measuring half-cells are ion-selective electrodes. A traditional ion-selective electrode has a housing that is closed by the ion-selective membrane and accommodates an inner electrolyte that is in contact with the membrane. The ion-selective electrode also comprises a terminal lead which is in contact with the inner electrolyte. The terminal lead is electrically conductively connected to the sensor circuit. If the ion-selective membrane for measuring is in contact with the measuring liquid, the membrane selectively interacts with a certain ionic species contained in the measuring liquid, namely with the analyte. Changing the activity or concentration of the ion in the measuring liquid causes a relative change in the equilibrium galvanic voltage between the measuring medium and the terminal lead in contact with the ion-selective membrane via the inner electrolyte. A special case of such an ion-selective electrode, e.g., an electrode that selectively detects the hydronium ion activity in a measuring liquid, is the known pH glass electrode, which comprises a glass membrane as the potential-forming sensor element. The term ion-selective layer, membrane, or electrode used here and hereinafter means an ion-sensitive layer, membrane, or electrode, the potential of which is preferably predominantly influenced by the analyte, e.g., a specific ion type or the pH value, wherein cross-sensitivities of the layer, membrane, or electrode for other types of ions are not excluded, but are preferably low.

Such ion-selective glass electrodes as well as potentiometric probes with corresponding glass electrodes are characterized by good measuring properties; in the case of a pH glass electrode, this relates for example to the gradient, long-term stability, selectivity and detection limit. However, the wall thickness of the high-impedance glass membranes is typically chosen to be very thin, and therefore they have only a low mechanical stability.

The ion-selective electrodes with solid terminal lead, also referred to as solid state electrodes, are an alternative. These include, for example, enamel electrodes such as are described in the published patent application DE 2721939 A1 or in the examined and published patent application DE 2133419. These electrodes generally have a metallic base body on which an ion-selective, especially pH-selective, glass layer is applied. The ion-selective layer may be an enamel coating. According to the definitions/labeling standards, RAL registration RAL-RG 529 A2 from July 2007 by RAL Deutsches Institut für Gütesicherung and Kennzeichnung e.V., a vitreous material that is produced by completely or partially melting substantially oxidic raw materials, is referred to as an enamel. The inorganic preparation thus produced is applied with additives in one or more layers to workpieces made of metal or glass and fused at temperatures above 480° C. Base constituents of (ion-selective) enamel layers are, for example, one or more of the oxides silicon oxide, sodium oxide, potassium oxide, calcium oxide, magnesium oxide and aluminum oxide. An ion-selective glass, e.g., pH glass, applied to a metallic base body using such a method is therefore also referred to hereinafter as an ion-selective enamel layer or, in the case of an enamel layer specifically selective for hydronium ions, as a pH enamel layer, and a corresponding electrode as an enamel electrode.

Such enamel electrodes are characterized by high mechanical stability and can be hygienically designed by providing an enamel coating covering all parts of the probe coming into contact with the process. They can therefore be used especially advantageously in processes of the food industry and in chemical processes in which frequent purifications are to be carried out.

Depending on the field of application, measuring half-cells and reference half-cells of potentiometric probes can each be configured in different variants. Reference half-cells can have, for example, different variants of transfers, for example different diaphragms. As described, measuring half-cells can have an ion-selective membrane which is in contact with an electrically conductive discharge element via a liquid or gelatinous internal electrolyte, or an ion-selective membrane or layer with a solid terminal lead. In different variants, the potential-forming element of the measuring half-cell may be selective for different ion types or have different cross-sensitivities. This generally leads to a plurality of probe variants during production which must be kept apart during manufacture. This causes high costs in production and storage.

Aging occurs during operation of the probes, especially if the probes are used in applications which require frequent cleaning and/or sterilization, or in which the probes serve for monitoring aggressive measuring liquids, for example in chemical production processes. The probes must therefore be replaced after a certain maximum period of use, depending on the particular application and on the particular probe.

SUMMARY

The object of the present disclosure is to provide a structure of a potentiometric probe that will simplify the production of probe variants.

This object is achieved by a potentiometric probe according to claim 1. Advantageous embodiments are listed in the dependent claims.

The potentiometric probe according to the present disclosure for measuring a measured variable that represents an ion concentration in a measuring liquid comprises
  a probe base including a sensor circuit, and
  two electrochemical half-cells arranged such that one of the half-cells surrounds at least one portion of the other half-cell, wherein at least one of the half-cells is configured as a module which is connected to the probe base via a mechanical and electrical interface.

In an advantageous embodiment, one of the half-cells can form a measuring half-cell comprising an ion-selective membrane and a terminal lead electrically contacting the ion-selective membrane. The other half-cell may form a reference half-cell.

By configuring the half-cells, for example, the measuring half-cell and/or the reference half-cell, as independently manageable modules, various variants of half-cell modules, e.g. measuring half-cell modules and/or reference half-cell modules, may be held available and/or provided, wherein different measuring half-cell modules may be combinable with one and the same reference half-cell module or various reference half-cell modules may be combinable with one and the same measuring half-cell module. Thus, a manufacturer of potentiometric probes can provide, for example, a set of different reference half-cell modules and a set of different measuring half-cell modules, each reference half-cell module of the set being combinable with each measuring half-cell module of the set to form a potentiometric measuring probe. For this purpose, the reference half-cell modules and measuring half-cell module modules have identical interfaces which are matched to one another and/or to the probe base and via which the half-cell modules are connectable to one another and to the probe base to form the probe.

The connection of the measuring half-cell and the reference half-cell to the probe base can be configured such as to be detachable or non-detachable. If the connection is configured such as to be detachable, users of the potentiometric probe will be able to replace the reference half-cell module and/or the measuring half-cell module with a new one, if necessary.

In one embodiment, the reference half-cell may be arranged such in relation to the measuring half-cell that it surrounds at least one portion, especially a longitudinal portion, of the measuring half-cell. In an alternative embodiment, the measuring half-cell may be arranged such in relation to the reference half-cell that it surrounds at least one portion, especially a longitudinal portion, of the reference half-cell.

In one possible embodiment, the measuring half-cell and the reference half-cell may be arranged coaxially in relation to a common longitudinal axis. The longitudinal axis may be a common cylinder symmetry axis of the measuring half-cell and reference half-cell. However, it is also possible for the measuring half-cell and/or reference half-cell to have no cylinder symmetry. In this case, the reference half-cell can surround or enclose the measuring half-cell at least in one portion extending in the longitudinal direction of the measuring half-cell. Alternatively, the measuring half-cell may surround or enclose the reference half-cell at least in a portion extending in the longitudinal direction of the reference half-cell.

In a first embodiment, the measuring half-cell can have a rod-shaped base body and an ion-selective layer, for example an ion-selective enamel layer or pH enamel layer, wherein the measuring half-cell comprises an electrically conductive terminal lead, wherein the ion-selective layer covers at least one surface region of the base body and is electrically contacted on its rear side facing the base body by the electrically conductive terminal lead, and wherein the reference half-cell surrounds the measuring half-cell at least in a longitudinal portion of the measuring half-cell. For example, the reference half-cell may surround the measuring half-cell coaxially with respect to an (imaginary) common longitudinal axis of the measuring half-cell and the reference half-cell at least in one portion of the measuring half-cell extending along the longitudinal axis. The common longitudinal axis can be, for example, a cylinder symmetry axis of the base body and/or of a housing of the reference half-cell. However, the base body and/or the measuring half-cell may also have an asymmetrical, for example fluidically optimized, cross section. In this case, the reference half-cell or a housing of the reference half-cell surrounds the measuring half-cell at least in one portion running along a longitudinal direction of the base body, the longitudinal direction extending perpendicular to the cross section of the rod-shaped base body.

In this first embodiment and in other embodiments described here, in which a solid terminal lead of the measuring half-cell potential is provided, the terminal lead may be, for example, a metallic conductor or a metallic conductor track, which rests on the base body, and may be covered with an electrically insulating layer in a region not covered by the ion-selective layer. The electrically insulating layer may be, for example, an electrically insulating enamel layer. The terminal lead may also be formed from the base body itself if the latter is made of an electrically conductive material. In this case, in regions not covered by the ion-selective layer the base body is also covered by an insulating coating, for example an insulating enamel.

In this first embodiment, the reference half-cell may comprise a housing having an annular interior space containing a reference element, wherein the housing has an inner tubular wall and an outer tubular wall, and at least one portion of the measuring half-cell is surrounded, especially enclosed, by the inner tubular wall. The inner and the outer tubular walls of the housing of the reference half-cell may be arranged coaxially with respect to an (imaginary) common longitudinal axis of the measuring half-cell and the reference half-cell. A reference electrolyte contacted by the reference element may be contained in the interior space. The internal electrolyte can be in electrolytic contact with a medium surrounding the probe via an electrochemical transfer, for example a gap or a diaphragm, arranged in the housing of the reference half-cell.

In a second embodiment of the potentiometric probe, the reference half-cell may comprise a housing, for example a cylindrical housing, which encloses an interior space containing a reference element, wherein the measuring half-cell surrounds the reference half-cell, especially the housing of the reference half-cell. For example, the measuring half-cell may surround the reference half-cell coaxially with respect to an (imaginary) common longitudinal axis of the reference half-cell and the measuring half-cell at least in a portion of the reference half-cell extending along the longitudinal axis. However, the reference half-cell or the housing of the reference half-cell may also have an asymmetrical, for example fluidically optimized, cross section. In this case, the measuring half-cell surrounds the reference half-cell at least in a portion running along a longitudinal direction of the base body, the longitudinal direction extending perpendicular to the cross section of the rod-shaped base body.

In this embodiment, the measuring half-cell may have a hollow cylindrical base body which surrounds the reference half-cell at least in portions, the measuring half-cell comprising an electrically conductive terminal lead, wherein the ion-selective membrane covers at least one surface region of the base body as an ion-selective layer and is electrically contacted on its rear side facing the base body by the electrically conductive terminal lead. The terminal lead may be, for example, a metallic conductor or a metallic conductor track resting on the base body and may be covered with an electrically insulating layer in a region not covered by the ion-selective layer. The electrically insulating layer may be, for example, an electrically insulating enamel layer. The terminal lead may also be formed by the base body itself if the latter is made of an electrically conductive material. In regions not covered by the ion-selective layer, the base body is covered by an insulating coating, for example insulating enamel.

The terminal lead may electrically contact the ion-selective membrane via an ion-conducting inner electrolyte. Alternatively, the ion-selective membrane may be formed as a layer which rests on the electrically conductive terminal lead. In this embodiment, the terminal lead is designed as a solid terminal lead. The layer may be an ion-selective enamel layer.

The measuring half-cell module and/or the reference half-cell module may both be directly connected or connectable to the probe base. It is also possible for the measuring half-cell module and/or the reference half-cell module to be connected indirectly to the probe base via the respective other half-cell module or via another component.

For example, the measuring half-cell may be configured as a measuring half-cell module and the reference half-cell as a reference half-cell module, wherein the reference half-cell module is connected to the probe base via a mechanical and electrical interface, and the measuring half-cell module is connected to the reference half-cell module via a mechanical and electrical interface, and wherein the reference half-cell module connects the measuring half-cell module electrically to the probe base.

Alternatively, the measuring half-cell module may be connected to the probe base via a mechanical and electrical interface. The reference half-cell module may be connected to the measuring half-cell module via a mechanical and electrical interface, wherein the measuring half-cell module connects the reference half-cell module electrically to the probe base.

The connection of the reference half-cell module or the measuring half-cell module to the probe base or another module may be formed via a single interface effecting both a mechanical and an electrical connection. However, it is also possible for the connection to be effected via a mechanical interface and an electrical interface executed separately from the mechanical interface.

An auxiliary electrode may be arranged in a region enclosed between the measuring half-cell and the reference half-cell, wherein the sensor circuit is configured to measure an impedance between the auxiliary electrode and the measuring half-cell and/or an impedance between the auxiliary electrode and the reference half-cell. This measurement can serve to monitor the sensor functionality.

The measuring half-cell and/or the reference half-cell may have an identification mark. The identification mark may comprise information about properties of the marked half-cell, for example about the probe type, measuring half-cell variant or reference half-cell variant, or about production, especially for half-cell traceability purposes. The identification mark may be, for example, a color of the housing of the measuring half-cell or of the reference half-cell or a code designed as an engraving or imprint. If the measuring half-cell has an enamel layer as ion-selective membrane or insulating layer for terminal lead purposes, as described above, the color of the enamel layer may also form such an identification mark. For this purpose, the enamel may contain colored glass components or color pigments.

Alternatively or in addition to an identification mark, the measuring half-cell and/or the reference half-cell may comprise a data memory, which may contain, for example, traceability information, configuration data and/or calibration data.

A temperature sensor may be integrated in the base body of the measuring half-cell. For example, the base body may be made of a metal or metal alloy and enclose a cavity in which a temperature sensor connectable to the sensor circuit is arranged. In an especially advantageous embodiment, the temperature sensor may be arranged close to the ion-selective layer arranged on the base body. Advantageously, the temperature sensor is in heat-conductive contact with the base body, for example via a heat-conductive connecting layer formed from a heat-conductive paint, a heat-conductive adhesive or another heat-conductive medium. The heat-conductive contact or heat-conductive connecting layer may be arranged in a region lying below the ion-selective membrane or layer of the measuring half-cell within the cavity formed in the base body.

The base body of the measuring half-cell carrying the ion-selective layer may be detachable from the probe base independently of the temperature sensor. In this case, the temperature sensor thus is not a component of the replaceable measuring half-cell module. If it is replaced, the temperature sensor may remain firmly connected to the probe base, e.g., is not exchanged with it.

In a further advantageous embodiment, a temperature sensor may be additionally arranged directly thermally contacted on the reference element of the reference half-cell. In both embodiments, the temperature sensor is advantageously arranged such that its measurement signal represents both the temperature of the ion-selective layer and the temperature of the reference element. In order to obtain very accurate measurement results, the sensor may have a plurality of temperature sensors, for example a first temperature sensor in thermal contact with the ion-selective layer and a second temperature sensor in thermal contact with the reference element.

As mentioned, the sensor may comprise a sensor circuit for detecting measurement signals. In an advantageous embodiment of the present disclosure, the sensor circuit may be configured to determine a raw measured value of the measured variable from a voltage detected as a measurement signal between the terminal lead of the measuring half-cell and the reference element and to carry out a temperature compensation of the raw measured value based on a temperature measurement signal of the one or more temperature sensors. The temperature compensation of the raw measured value serves to compensate for the temperature dependence of the steepness of the potentiometric measuring chain formed from the measuring half-cell and the reference half-cell.

The sensor circuit may be configured to convert analog measurement signals, for example an analog voltage detected between measurement half-cell and reference half-cell or an analog signal of the temperature sensor, into digital measurement signals. Further, the sensor circuit may include an electronic circuit having one or more microprocessors configured to process the digitized measurement signals. To carry out the temperature compensation, the sensor circuit may be configured to execute a computer program stored in a memory of the sensor circuit that serves to determine temperature-compensated measured values.

The measuring half-cell may comprise a shield layer made of an electrically conductive material that surrounds at least one portion of the electrical terminal lead and thus shields from electric fields. This is especially advantageous for the second embodiment described above where the measuring half-cell surrounds the reference half-cell. In the first embodiment described above where the reference half-cell surrounds the measuring half-cell, the reference electrolyte may act as a shield for the measuring half-cell. Nevertheless, the additional shielding of the measuring half-cell by a shield layer made of an electrically conductive material may be advantageous. The shield layer may be configured as an electrically conductive layer which encloses the electrical terminal lead of the measuring half-cell and surrounds the cylindrical or hollow cylindrical base body of the measuring half-cell.

The measuring half-cell may comprise a preamplifier connectable to the sensor circuit and/or an impedance transformer, which may be arranged in a cavity enclosed by the base body of the measuring half-cell. One input of the preamplifier may be connected to the electrically conductive terminal lead of the measuring half-cell, and a second input may be at the potential of the shield. The electrically conductive connection of the input of the preamplifier to the terminal lead may be effected in a conventional manner by a soldered connection, but also by a conductive intermediate layer. The preamplifier or impedance transformer may be connected, especially detachably connected, to the sensor circuit contained in the probe base via the interface via which the measuring half-cell is connected to the probe base. The signal-to-noise ratio of the measurement signal of the potentiometric probe may be increased by means of the preamplifier.

The respective exterior half-cell (measuring half-cell or reference half-cell) may have on its exterior wall an electrically conductive layer intended for contact with the surrounding medium, for example a surrounding measuring liquid. This can be used for electromagnetic shielding and/or for use as a redox electrode for measurements of the redox potential of the surrounding medium relative to the reference half-cell or as a potential compensation element (also referred to as PAL or solution ground).

BRIEF DESCRIPTION OF THE DRAWINGS

The present disclosure is explained in further detail below on the basis of the exemplary embodiments shown in the figures. They show.

DETAILED DESCRIPTION

Figure 1:
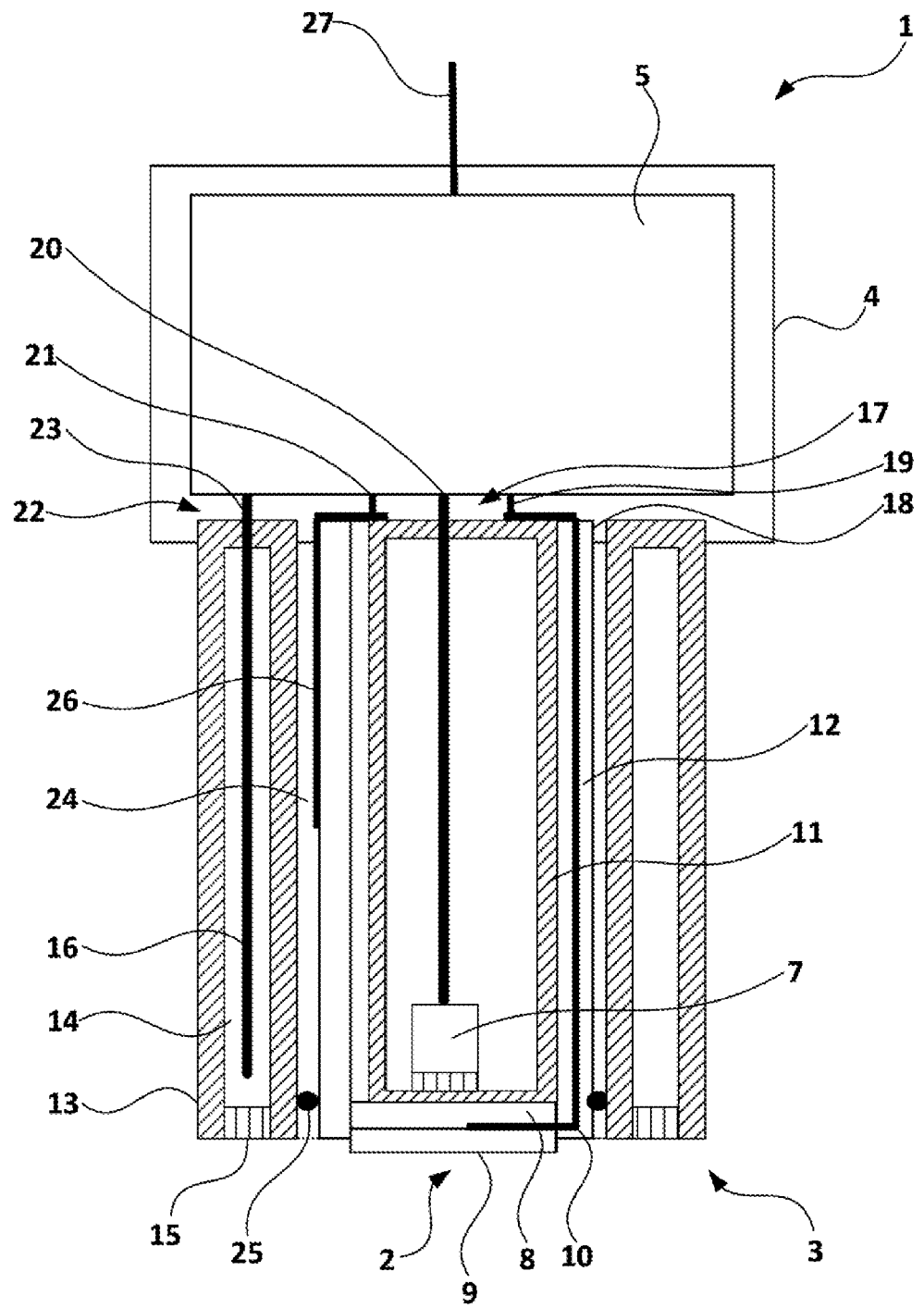
FIG. 1 shows a schematic longitudinal section view of a potentiometric probe in a first embodiment.

FIG. 1 schematically shows a potentiometric probe 1 for measuring a pH value in a measuring liquid. Probe 1 is formed from a measuring half-cell 2, a reference half-cell 3 and a probe base 4. The probe base 4 comprises a housing in which a sensor circuit 5 is arranged. In the present example, the measuring half-cell 2 and the reference half-cell 3 are arranged coaxially in relation to an imaginary common longitudinal axis, which simultaneously forms a cylinder symmetry axis of the two half-cells, wherein the reference half-cell 3 surrounds the measuring half-cell 2. The front end of the probe 1 facing away from the probe base 4 serves as an immersion region intended for immersion into the measuring liquid.

In the present example, the measuring half-cell 2 is configured as an enamel electrode. It has a cylindrical base body 11 made of a metal or metal alloy, for example steel. Enclosed in the base body 11 is a cavity in which a temperature sensor 7 is arranged. Advantageously, the temperature sensor 7 is in good heat-conducting contact with the base body 11, for example via a heat-conductive adhesive layer, so that the temperature sensor 7 detects temperature changes of the base body 11 and consequently temperature changes of the measuring liquid and of the ion-selective layer 10 with short response time during measuring operation. The temperature sensor 7 is connected to the sensor circuit 5.

The base body 11 is covered with a system of layers on its outside. In the present exemplary embodiment, the base body 11 has a base layer 8 of an insulating material, for example an insulating enamel layer, on the end face. An ion-selective enamel layer 9, which in the present example comprises pH glass, is arranged above the base layer 8. On the rear side, the ion-selective layer 9 is electrically contacted by a metallic terminal lead 10. The terminal lead 10 is guided in the longitudinal direction along the outer cylinder lateral surface of the base body 11 up to the rear face of the base body 11 opposite the end face with the ion-selective layer 9. The terminal lead 10 is embedded in an electrically insulating coating 12, for example an insulating enamel layer, which electrically insulates the terminal lead 10 from the base body 11 and from the surroundings of the measuring half-cell 2. The coating 12 may be formed from a plurality of individual layers of identical or different glass compositions. The terminal lead 10 may be embodied, for example, as a metallic coating on a layer of the coating 12.

In one modification of the exemplary embodiment, the electrically conductive base body 11 itself may serve as a terminal lead. In that case, the ion-selective enamel layer 9 is applied directly on the base body 11. A surface area not covered by the ion-selective enamel layer 9, for example the lateral surface of the base body 11, which is cylindrical in the present case, may be covered by an electrically insulating coating 12, for example an insulating enamel, and thus be insulated from the surroundings of the measuring half-cell 12.

The reference half-cell 3 has a housing 13, the wall of which comprises an inner tube and an outer tube extending coaxially with the inner tube, a cavity 14 being enclosed between the inner tube and the outer tube. The housing 13 may consist, for example, of plastic, a metal or a metal alloy or of glass. On the rear side, the cavity 14 is closed in a liquid-tight manner by a plug, an adhesive bond or in some other way. On the front side, an annular, porous diaphragm 15, for example of a porous ceramic or a porous plastic, is glued or clamped between the inner tube and the outer tube. A reference electrolyte, which is in contact with the surroundings of the probe 1 via the diaphragm 15, is accommodated in the cavity 14. The reference electrolyte is contacted by a reference element 16. The reference electrolyte may comprise a solution of potassium chloride; the reference element 16 may be a silver wire coated with silver chloride.

In the present example, the measuring half-cell 2 and the reference half-cell 3 are configured as self-contained modules which can be each handled individually during production of the probe 1. In the present example, the measuring half-cell module is detachably connected to the probe base 4 via a mechanical and electrical interface 17. In this example, the interface 17 comprises a slot 18 in the housing of the probe base 4 which is matched to the circumference of the measuring half-cell module and has electrical contacts 19, 20, 21 via which an electrical connection of the measuring half-cell 2 including the temperature sensor 7 to the sensor circuit 5 is formed. The reference half-cell module is correspondingly detachably connected to the probe base 4 via the mechanical and electrical interface 22. The interface 22 comprises an annular slot in the housing of the probe base 4 which is matched to the shape of the reference half-cell module and has an electrical contact 23 via which an electrical connection of the reference half-cell 3 to the sensor circuit 5 is formed.

The gap 24 between the measuring half-cell 2 and the reference half-cell 3 is sealed with a sealing element 25 from the medium surrounding the probe 1. The seal can be monitored by means of an auxiliary electrode 26 arranged in the gap 24. In the example shown here, the auxiliary electrode 26 is configured as a metal layer on the surface of the measuring half-cell 2 facing the gap 24. The metal layer is arranged on the coating 12 of the base body 11 of the measuring half-cell 2 and is thus electrically insulated from the electrically conductive base body 11 and the terminal lead 10. The auxiliary electrode 26 is connected to the measuring circuit via the plug connector 21.

When manufacturing the probe 1, the measuring half-cell module, the reference half-cell module and the probe base 4 can be each manufactured and stored separately. The finished probe 1 is produced by assembling the modules. Moreover, different variants of the measuring half-cell module and of the reference half-cell module as well as of the probe base can be created and kept available which, in terms of their dimensions and interfaces, are configured in such a matching way that they can be assembled to form a probe 1. This way, the manufacturer can easily produce a plurality of probe variants.

If the probe 1 is used in measuring operation, the user can replace aged parts of the probe, for example the reference half-cell module or the measuring half-cell module, with new, identically configured modules.

In an alternative exemplary embodiment, the modules are not detachably connected to one another, for example they can be connected to one another by an adhesive or soldered connection. In that case, the advantage for manufacturing continues to exist, but the user must replace the entire probe when the measuring or reference half-cell is damaged or shows a loss in functionality.

The sensor circuit 5 is configured to detect, process, especially amplify and digitize, a voltage between the terminal lead 10 of the measuring half-cell 2 and the reference element 16 of the reference half-cell 3 and to generate and/or output a measurement signal that depends on the voltage. The measurement signal represents the pH of a measuring liquid contacting the measuring half-cell 2 and the reference half-cell 3 in the region of the diaphragm 15 and the ion-selective layer 9. The sensor circuit 5 can communicate with a higher-level unit (not shown here) via a communication interface 27 in a wired or wireless manner. The higher-level unit may be an operating device, a measuring transducer, some other data processing device, for example a tablet, a smartphone or data goggles. In addition to transmitting the measurement signals from the sensor circuit 5 to the higher-level unit, further data may be transmittable in either direction in order to configure, parameterize, or calibrate the probe 1 or to process diagnostic information of the probe 1 in the higher-level unit.

In the present example, the sensor circuit 5 is further configured to receive and process measurement signals of the temperature sensor 7, e.g. for the purpose of temperature compensation of the pH measurements generated from the measurement signal. The pH sensitivity of the sensor is typically temperature-dependent, so the temperature compensation can serve as a computational compensation of the temperature dependence of the raw measured values. The sensor circuit 5 is further configured to measure an impedance between the auxiliary electrode 26 and the reference element 16 and/or an impedance between the auxiliary electrode 26 and the terminal lead 10 and to monitor whether the impedance falls below a predetermined limit value stored in the sensor circuit 9. The limit value is set such that an undershooting of the limit value is an indication of moisture entering the gap 24. An undershooting of the limit value is therefore an indication that the seal 25 no longer seals the gap 24 sufficiently, and that there is therefore the risk of liquid reaching the interfaces 17 and 22. If liquid reaches the interfaces 17, 22, a correct measurement can no longer be guaranteed. The sensor circuit 5 is therefore configured to output a warning signal to the higher-level unit when the stored limit value for the measured impedances is undershot.

In a further exemplary embodiment (not shown in FIG. 1), the reference half-cell module and/or the measuring half-cell module may comprise an identification or a data carrier, which comprise information about the reference half-cell module. The identification may be, for example, a code, especially a machine-readable code, which identifies the modules for manufacturing and logistics purposes, especially for module traceability purposes. The data carrier may be, for example, an RFID chip or a data memory where data such as an identifier of the module, date of manufacture, calibration data, an identification of the probe in which the module is to be used, configuration data, a service life of the module, counters for sterilizations, calibrations or cleanings that the module has undergone, and further similar data can be stored. The sensor circuit 5 may be configured to read out and process the data stored in the data carrier when a reference half-cell module or a measuring half-cell module is connected to the probe base 4 and/or to output it to the higher-level unit. The sensor circuit 5 may also be configured to perform a calibration by means of data read out from the memory. The sensor circuit 5 may check, for example, whether the connected measuring and reference half-cell modules fit together and match the probe base. It can further recognize the type of modules connected and tune a measurement signal evaluation to the type of modules connected, for example call up suitable calibration functions or suitable evaluation algorithms. It can moreover read out calibration data stored in the modules and use them for evaluating the measurement signals.

In an alternative exemplary embodiment, the measuring half-cell module may be configured as a conventional pH glass electrode with a sensitive glass membrane rather than as a pH enamel electrode, the glass membrane being contacted via an internal electrolyte solution by a terminal lead immersing the internal electrolyte.

In the exemplary embodiment shown in FIG. 1, the temperature sensor 7, being a component of the measuring half-cell module, is replaceable together with the measuring half-cell module. In an alternative embodiment, the temperature sensor 7 may remain firmly connected to the sensor circuit 5 while the measuring half-cell module can be replaced.

Figure 2:
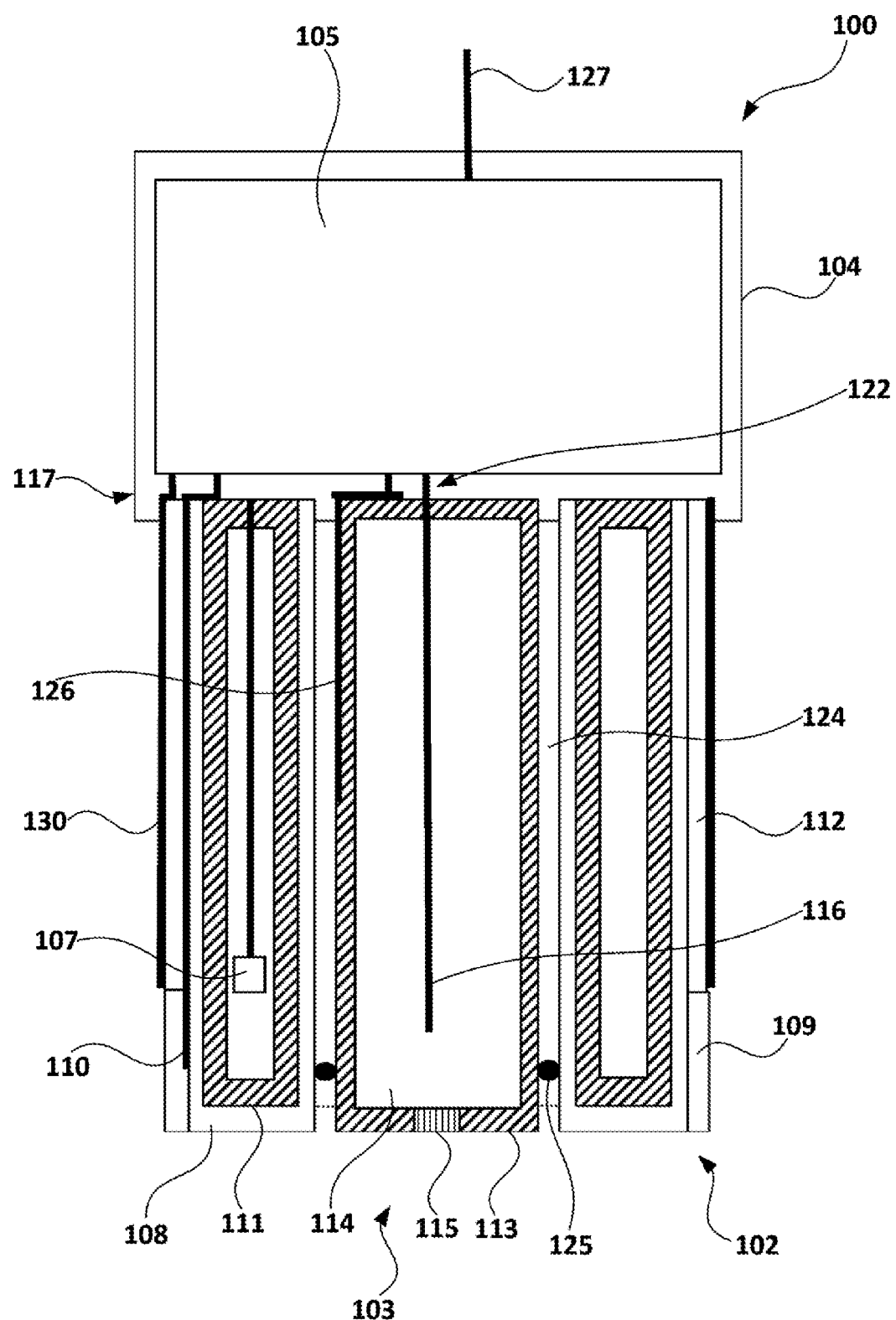
FIG. 2 shows a schematic longitudinal section view of a potentiometric probe in a second embodiment.

FIG. 2 shows a schematic longitudinal section view of a further exemplary embodiment of a potentiometric probe 100 for measuring a sodium ion concentration in a measuring liquid that provides the same advantages and functionalities as described with reference to the probe 1 shown in FIG. 1. This probe 100 differs from the probe 1 shown in FIG. 1 in that the reference half-cell 103 is inside and the measuring half-cell 102 surrounds the reference half-cell 103.

The reference half-cell 103 is configured as a replaceable reference half-cell module detachably connected to the probe base 104. It has a cylindrical housing 113 with a cavity 114 filled with a reference electrolyte. The reference electrolyte is contacted by a reference element 116. A porous diaphragm 115, which makes electrolytic contact between the reference electrolyte and a medium contacting the diaphragm 115, is arranged in the wall of the housing 113 in a face region of the housing 113 intended for immersion into a measuring liquid. The housing 113, the diaphragm 115, the reference electrolyte and the reference element 116 may be furthermore configured as the corresponding elements of the probe 1 shown in FIG. 1.

The measuring half-cell 102 is also configured as a replaceable measuring half-cell module detachably connected to the probe base 104. It has a base body 111 made of metal or metal alloy in which a cavity is formed. A temperature sensor 107, the electrical connection of which is led out of the base body 111, is arranged in the cavity. The temperature sensor 107 can be in direct thermal contact with the base body 111, e.g. by being connected to the base body 111 via a heat-conductive solder or adhesive layer. A base layer 108 consisting of an insulating enamel is applied to the base body 111. A circumferential ion-selective enamel coating 109, which in the present example is made of a sodium-selective glass, is arranged on the base layer 108 in a front region of the measuring half-cell 102 intended for immersion in a measuring liquid. The coating 109 is electrically contacted on the rear side by a metallic terminal lead 110. The terminal lead 110 may be formed from a metal layer, as in the present example, that is deposited on the base layer 108. It can surround the measuring half-cell 102 over the entire surface of its circumference or, as in the example shown here, be configured as a conductor track. The terminal lead 110 is covered by a single-layer or multi-layer coating 112 of an insulating glass or insulating enamel. An electrical shield 130 surrounding the circumference of the measuring half-cell 102 is arranged on the coating 112. The shield 130 can be formed from an electrically conductive, for example metallic, coating. Alternatively, it may also be formed from a conductive polymer material.

In a modification of the exemplary embodiment described here, the base body 111 itself can serve as a terminal lead 110. In this case, areas of the outer surface of the base body 111 which are not covered by the ion-selective enamel coating 109 are covered by the insulating base layer 108 and are thus electrically insulated from the environment. The shield 130 may be arranged on the base layer 108 or on a coating 112 covering the base layer 108 and surround the measuring half-cell or the base body 108 in its entire circumference.

In a further modification of the exemplary embodiment described here, the electrically conductive coating serving as a shield 130 in the previously described exemplary embodiment may alternatively or additionally serve as a redox electrode for measuring the redox potential of the measuring liquid relative to the reference half-cell and/or as a potential equalization element (PAL, also referred to as solution ground).

Very similar to the first exemplary embodiment, the probe base 104 has a housing and a sensor circuit 105 arranged therein which has the same properties and functionalities as the sensor circuit of the exemplary embodiment shown in FIG. 1. A main function of the sensor circuit 105 is to generate measurement signals based on the voltage detected between the reference half-cell 103 and the measuring half-cell 102. The measurement signals represent the sodium ion concentration in the measuring liquid contacting the ion-selective layer 109 and the diaphragm 115. The measuring half-cell 102 is connected to the sensor circuit 105 via a high-impedance input, so that the voltage measurement is effected quasi at zero current. The influence of outer electrical fields can therefore lead to considerable disturbances of the measurement. Since the measuring half-cell 102 (unlike in the first exemplary embodiment, FIG. 1) is located outside in the present embodiment, the electrolyte-filled reference half-cell 103 may not act as a shield of the measuring half-cell 102 herein. The terminal lead 110 of the measuring half-cell 102 is therefore protected by the additional shield 130 in the present example.

The measuring half-cell module and the reference half-cell module are detachably connected to the probe base 104 and the sensor circuit 105 via mechanical and electrical interfaces 117 and 122. The sensor circuit 105 also has a communication interface 127 for communication with a higher-level unit.

An auxiliary electrode 126, which in the exemplary embodiment shown here is configured as a metallic coating on the outside of the housing 113 of the reference half-cell, is arranged in the gap 124 sealed by the sealing element 125 between the reference half-cell module and the measuring half-cell module.

The terminal lead 110 of the measuring half-cell 102, the reference element 116 of the reference half-cell, the temperature sensor 107, the auxiliary electrode 126 and the shield 130 are each connected to the sensor circuit via the electrical interfaces 117, 122 of the half-cell modules. The detachable electrical connection can be effected for example via plug contacts or sliding contacts.

Very similarly, as described in detail above for the first exemplary embodiment, the sensor circuit 105 may generate and output measurement signals dependent on the sodium concentration in a measuring liquid contacting the probe 100 in the region of the diaphragm 115 and the ion-selective layer 109 based on a voltage measurement between the reference element 116 and the terminal lead 110. The sensor circuit 105 may be further configured to detect temperature measurement signals of the temperature sensor 107 and to perform temperature compensation of the measurement signals or to output the measurement signals and the temperature signal to the higher-level unit in order for the latter to perform the temperature compensation. Moreover, the sensor circuit 105 can monitor the sealing effect of the sealing element 125 by means of the auxiliary electrode as described above.

Finally, the sensor circuit 105 may be configured to adjust the potential of the shield 130 to the potential of the measuring half-cell 103. Such a shield is also referred to as driven guard and is described, for example, in an article by A. Rich entitled "Shielding and Guarding—How to Exclude Interference-Type Noise, What to Do and Why to Do It—A rational Approach", Analog Dialogue 17-1, 1983, or, for the application of a pH electrode as reference electrode in electrochemical systems, in WO 2014/016121 A1.

As described above, the individual modules may carry identifiers or data in a memory readable by the sensor circuit 105 to enable identification, traceability, matching, or pre-calibration of the replaceable modules.

Figure 3:
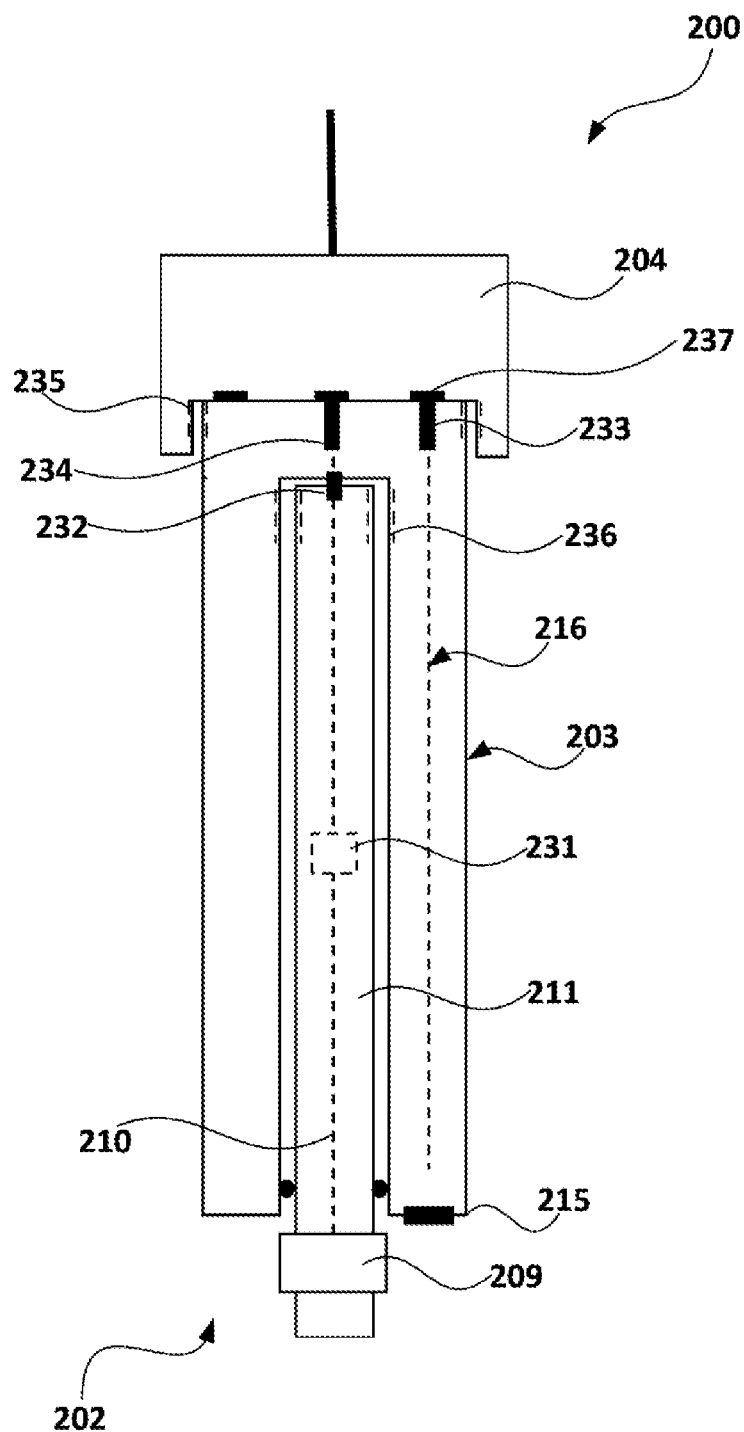
FIG. 3 shows a schematic view of a potentiometric probe having a replaceable measuring half-cell module and a replaceable reference half-cell module in a third embodiment.

Schematically shown in FIG. 3 is a third exemplary embodiment of a potentiometric probe 200. The probe 200 comprises a probe base 204 having a measuring circuit (not shown in FIG. 3), a measuring half-cell 202 and a reference half-cell 203. The measuring half-cell 202 and the reference half-cell 203 are again configured as independently manageable modules. Each module and the probe base 204 may provide the same functionalities as corresponding elements in the previously described exemplary embodiments. The details, such as temperature sensor, shield, auxiliary electrode and identification mark and the layer structure of the measuring half-cell 202 are not described again in connection with the exemplary embodiment shown here. However, the corresponding features of the examples described above can be applied analogously to the probe 200 shown in FIG. 3.

The measuring half-cell 202 has a rod-shaped base body 211 carrying an ion-selective layer 209. In the present exemplary embodiment, the ion-selective layer 209 comprises a lithium-containing pH glass. The remaining regions of the surface of the base body 211, especially those intended to be brought into contact with the measuring liquid during measuring operation of the probe, are covered with an insulating enamel layer. The base body 211 has also a terminal lead 210 contacting the ion-selective layer 209 that may be embedded, for example, in insulating enamel layers or may be guided within a cavity in the base body 211. In the exemplary embodiment shown here, the base body 211 also comprises a preamplifier 231 connected via its first input to the terminal lead 210 and electrically conductively connected to an electrical connection 232 of the measuring half-cell 202. Another input of the preamplifier 231 may be at the potential of the shield or any other potential, for example provided by an auxiliary electrode.

In a modification of this exemplary embodiment, the preamplifier 231 may also be arranged close to the ion-selective layer 209 and be conductively connected to the terminal lead 210, which in this embodiment may be configured as an electrical conductor arranged in the base body. The conductive connection may be made for example of a layer, for example designed as an intermediate layer, or a nonwoven, felt or wool made of an electrically conductive material such as carbon.

The reference half-cell 203 has a housing containing a reference electrolyte and a reference element 216 arranged in the housing that contacts the reference electrolyte. The reference element 216 is connected to an electrical connection 233 of the reference half-cell 203. Via a diaphragm 215 arranged in the wall of the housing, the reference electrolyte is in contact with a medium surrounding the probe 200. The front region of the probe 200 comprising the diaphragm 215 and the ion-selective layer 209 is intended for immersion in a measuring liquid to determine the pH of the measuring liquid.

The housing of the reference half-cell 203 is cylindrical in shape and has a cylindrical recess intended to receive the measuring half-cell module. The measuring half-cell module may be mechanically connected to the reference half-cell module via a threaded connection 236. The electrical connection 232 of the measuring half-cell 202 is rotatable in the corresponding counterpart of the reference half-cell 203 during screwing of the measuring half-cell module. The electrical connection 232 is electrically conductively connected to a further electrical connection 234 of the reference half-cell 203 above the measuring half-cell, so that electrical signals of the measuring half-cell 202 can be forwarded to the connection 234 through the reference half-cell.

The reference half-cell 203 is in turn detachably connectable to the probe base 204 via the threaded connection 235. The electrical connection 233 of the reference half-cell 203 interacts with a sliding contact 237 of the probe base 204 so that when the reference half-cell 203 is screwed in, an electrical connection between the reference half-cell 203 and the probe base 204 is simultaneously produced in addition to the mechanical connection. The connection 234 which is connected to the connection 232 of the measuring half-cell 202 is rotatably movable in the corresponding counterpart of the probe base 204.

This way, the reference half-cell module 203, and with it the measuring half-cell module 202, may be mechanically and electrically connected to the probe base 204 and the sensor circuit contained therein.

Thus, the terminal lead 210 of the measuring half-cell 202 is connected to the sensor circuit in the probe base 204 via the preamplifier 231 and connections 232 and 234 through the reference half-cell module. The reference element 216 of the reference half-cell 203 is likewise connected to the sensor circuit via the connection 233. The sensor circuit can thus measure a voltage dependent on the pH value of the measuring liquid between the terminal lead 210 and the reference element 216. The preamplifier 231 integrated in the circuit improves the signal-to-noise ratio of the detected measurement signal.

The probe 200 shown in FIG. 3 can furthermore have an auxiliary electrode for checking the seal 225 that is arranged between the measuring half-cell 202 and reference half-cell 203 and can also be connected to the sensor circuit via electrical interfaces. Further, the probe 200 may have a temperature sensor arranged in the measuring half-cell 202 for additional temperature measurement and temperature compensation and may be configured similarly as in the previously described exemplary embodiments.

Because of its modular design, the probe 200, just like the probes of the previously described exemplary embodiment, allows for the simplified manufacture of many different probe variants having different measuring and reference half-cell modules which are matched to one another in terms of their geometry and their interfaces. The probe moreover allows for the replacement of aged modules with new modules by the user.

The invention claimed is:

1. A potentiometric probe for measuring a measured variable representing an ion concentration in a measuring medium, the probe comprising:
a probe base including a sensor circuit;
a measuring half-cell comprising:
an ion-selective membrane;
an electrically conductive terminal lead electrically contacting the ion-selective membrane;
a base body configured to enclose a cavity in which a temperature sensor connectable to the sensor circuit is disposed, the base body comprising a metal or a metal alloy,
wherein the ion-selective membrane covers at least one surface region of the base body as an ion-selective layer and is electrically contacted on its rear side facing the base body by the terminal lead; and
a reference half-cell, wherein at least one of the measuring half-cell and the reference half-cell is connected to the probe base via a mechanical-electrical interface, and wherein the measuring half-cell and the reference half-cell are each configured such that:
the reference half-cell surrounds at least a portion of the measuring half-cell; or
the measuring half-cell surrounds at least a portion of the reference half-cell.

2. The probe of claim 1, wherein the reference half-cell is arranged in relation to the measuring half-cell such that the reference half-cell surrounds at least a portion of the measuring half-cell.

3. The probe of claim 1, wherein:
the base body of the measuring half-cell is generally rod-shaped; and
the reference half-cell surrounds the measuring half-cell at least in a longitudinal portion of the measuring half-cell.

4. The probe of claim 3, wherein the reference half-cell comprises a housing that encloses an annular interior volume containing a reference element, the housing including an inner tubular wall and an outer tubular wall, wherein at least the longitudinal portion of the measuring half-cell is surrounded by the inner tubular wall.

5. The probe of claim 1, wherein the measuring half-cell is arranged in relation to the reference half-cell such that the measuring half-cell surrounds at least one portion of the reference half-cell.

6. The probe of claim 5, wherein the reference half-cell comprises a cylindrical housing that encloses an interior volume containing a reference element, and wherein the measuring half-cell surrounds the housing of the reference half-cell at least in a longitudinal portion of the reference half-cell.

7. The probe of claim 6, wherein the base body of the measuring half-cell is a hollow cylindrical base body, which surrounds the reference half-cell at least in portions.

8. The probe of claim 1, wherein the ion-selective membrane is an ion-selective enamel layer.

9. The probe of claim 1, wherein:
the measuring half-cell is configured as a measuring half-cell module and the reference half-cell as a reference half-cell module;
the reference half-cell module is connected to the probe base via a first mechanical-electrical interface;
the measuring half-cell module is connected to the reference half-cell module via a second mechanical-electrical interface; and
the reference half-cell module connects the measuring half-cell module electrically to the probe base.

10. The probe of claim 1, wherein an auxiliary electrode is disposed in a region enclosed between the measuring half-cell and the reference half-cell, and wherein the sensor circuit is configured to measure an impedance between the auxiliary electrode and the measuring half-cell and/or an impedance between the auxiliary electrode and the reference half-cell.

11. The probe of claim 1, wherein the measuring half-cell and/or the reference half-cell have an identification mark.

12. The probe of claim 1, wherein the measuring half-cell and/or the reference half-cell comprise a data memory.

13. The probe of claim 1, wherein the base body of the measuring half-cell is detachable from the probe base independently of the temperature sensor.

14. The probe of claim 1, wherein the measuring half-cell comprises a preamplifier that can be connected to the sensor circuit.

15. The probe of claim 1, wherein the reference half-cell includes a shield layer.

16. The probe of claim 1, wherein both the measuring half-cell and the reference half-cell are connected to the probe base via the mechanical-electrical interface.

17. The probe of claim 1, wherein the measuring half-cell is connected to the probe base via a first mechanical-electrical interface, and wherein the reference half-cell is connected to the probe base via a second mechanical-electrical interface.

18. A potentiometric probe for measuring a measured variable representing an ion concentration in a measuring medium, the probe comprising:
a probe base including a sensor circuit;
a measuring half-cell comprising:
an ion-selective membrane; and
a base body configured to enclose a cavity in which a temperature sensor connectable to the sensor circuit is disposed, the base body comprising a metal or an electrically conductive metal alloy,
wherein the ion-selective membrane covers at least one surface region of the base body as an ion-selective layer and is electrically contacted on its rear side facing the base body by the base body, which is configured as a terminal lead; and
a reference half-cell, wherein at least one of the measuring half-cell and the reference half-cell is connected to the probe base via a mechanical-electrical interface, and wherein the measuring half-cell and the reference half-cell are each configured such that:
the reference half-cell surrounds at least a portion of the measuring half-cell; or
the measuring half-cell surrounds at least a portion of the reference half-cell.

19. The probe of claim 1, wherein:
the measuring half-cell is configured as a measuring half-cell module and the reference half-cell as a reference half-cell module;
the measuring half-cell module is connected to the probe base via a second mechanical-electrical interface;
the reference half-cell module is connected to the measuring half-cell module via a first mechanical-electrical interface; and
the measuring half-cell module connects the reference half-cell module electrically to the probe base.

\* \* \* \* \*